SELECTION DEVICE

Original Filed Jan. 3, 1964

INVENTOR
SAMUEL NISSIM
BY Arthur Freilich
ATTORNEY 3,316,540
Patented Apr. 25, 1967

3,316,540

SELECTION DEVICE

Samuel Nissim, Malibu, Calif., assignor to The Bunker-Ramo Corporation, Stamford, Conn., a corporation of Delaware Continuation of application Ser. No. 335,628, Jan. 3, 1964. This application Sept. 19, 1966, Ser. No. 580,498
16 Claims. (Cl. 340—172.5)

Figures 1, 2:
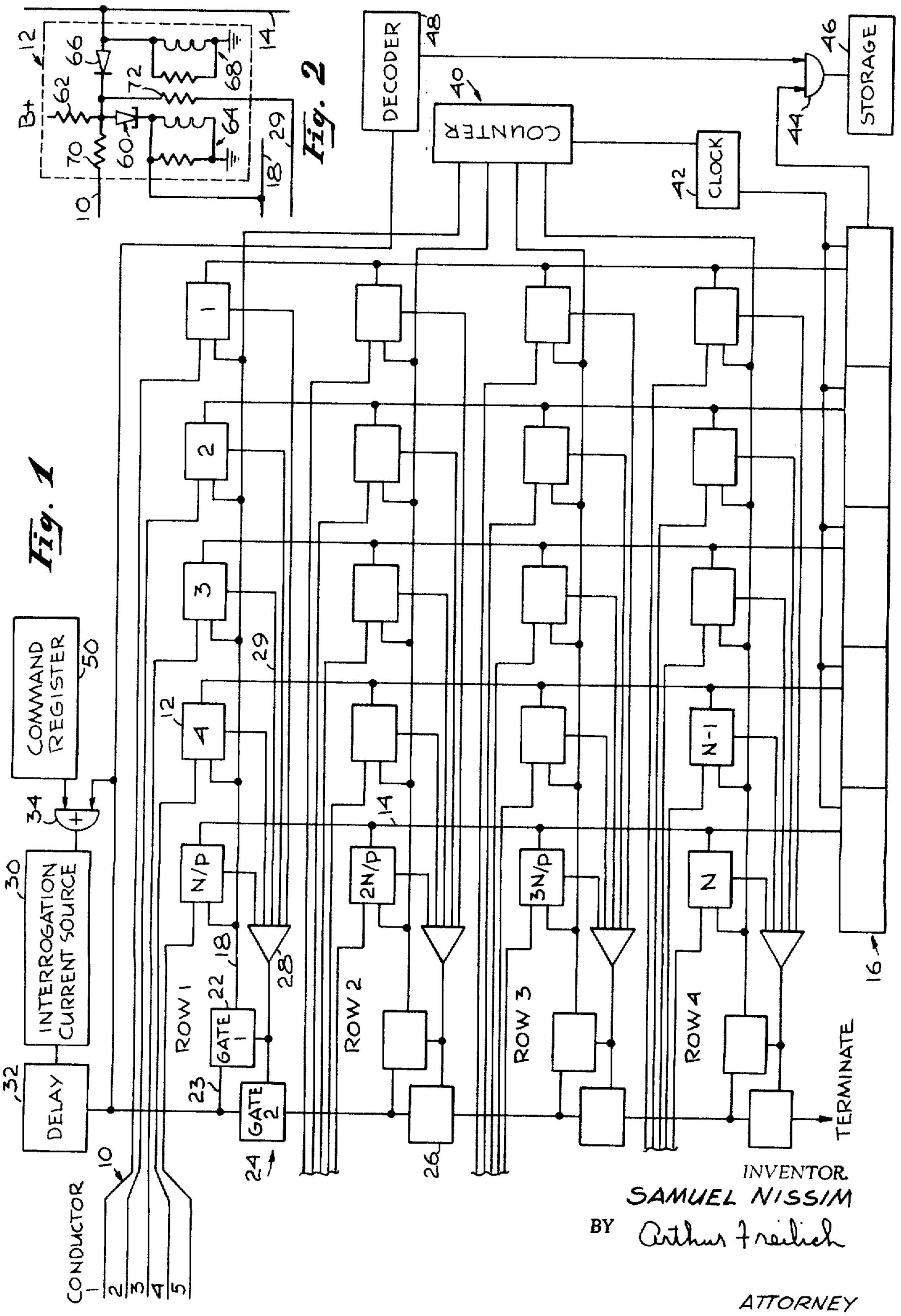

This is a continuation of application Ser. No. 335,628, filed Jan. 3, 1964.

This invention relates generally to data processing apparatus and more particularly to a selection device for use with a plurality of binary elements, for seeking out and selecting those elements in a given state and finds particular utility in monitoring a plurality of conductors.

For purposes of illustration and explanation, the invention herein will be described in connection with binary digital data processing apparatus but it is specifically pointed out that the term "binary" is used only in the sense that two different broad classes of manifestations are contemplated. For example, the two possible values of a binary manifestation can be respectively represented by the presence and absence of an electrical pulse but in addition the two values can be respectively represented by the presence and absence of an electrical pulse having predetermined and very precise characteristics.

In many diverse digital data processing systems, a bank of binary elements is provided with each element being connected to a different conductor so as to sense a binary signal therein, which can be manifested by the presence or absence of a pulse of a predetermined characteristic and can be representative of the occurrence or non-occurrence of a different condition. The binary element can be made to assume a true state, for example, in response to the presence of said pulse. It is often desired to be able to examine the respective states of the various elements at the end of a certain time interval in order to determine which elements were switched to the true state or alternatively which elements remained in the false state. Although straightforward commutation techniques can be used to sequentially sample each element, this procedure is often unnecessarily slow, particularly where the number of elements assuming the sought state is small compared to the total number of elements in the bank.

This latter situation often arises, for example, in the use of digital memories of the type disclosed in U.S. Patent No. 3,031,650 which can appropriately be considered a content addressable memory inasmuch as its storage locations are addressed or selected on the basis of the contents stored therein rather than on the basis of some arbitrarily assigned address. Such a memory permits all of the memory storage locations to be simultaneously searched to determine whether any of the words stored therein is identical to a search word being sought. A different word sense line is associated with all of the storage elements of each storage location and for each bit of any stored word which mismatches the corresponding bit of the search word, a pulse is provided on the word sense line associated with the location containing the mismatching bit. (Of course, in an alternative embodiment, pulses can be provided to represent a match situation.) Each word sense line can have a different binary sense element connected thereto which can be switched to a true state in response to the presence of one or more pulses on the associated word sense line. Although, in the content addressable memory embodiment disclosed in the cited patent, mismatch signals can be simultaneously generated for all bit positions, in other content addressable memory embodiments mismatch signals are generated in sequence for difference bit positions. In either case, at the end of a search period, it is desirable to examine all sense elements to determine which ones, if any, remained in the false state. A binary element remaining in the false state would of course indicate that all of the bits stored in the associated storage location are respectively identical to the corresponding bits of the search word. In addition to merely determining which binary elements remained in the false state, it is sometimes desirable to make these determinations sequentially in order to permit this information to be conventionally utilized to subsequently read out, write in, or modify the same or other information in the same or another memory. Such information is usually desired in the form of a sequence of memory location addresses.

Inasmuch as the number (M) of binary elements remaining in the false state for most contemplated applications of a content addressable memory will be extremely small compared to the number (N) of binary elements which are switched to the true state, it is desirable to avoid the utilization of conventional time consuming commutation techniques to sequentially sample each of the elements.

In view of this, it is an object of the present invention to provide a selection device for use with a plurality of binary elements for rapidly seeking out and selecting in sequence elements in a given state.

It is a more particular object of this invention to provide apparatus for use with a content addressable memory for sequentially generating addresses of memory locations storing words matching a search word.

Briefly, the invention herein is based upon the concept that an optimum compromise between hardware complexity and operational speed of an apparatus for selecting binary elements in a particular state out of a plurality of such elements, can be effected by separating the plurality of elements into groups and then considering the elements in sequence in those groups containing any elements in said particular state while disregarding those groups containing no elements in said particular state.

In a preferred embodiment of the invention, the binary elements are electrically connected in a rectangular matrix arrangement with each group of elements being contained in a different matrix row. A different gate controller is associated with each row and functions to sense whether or not all of the elements associated therewith are in a second state. Each gate controller controls first and second current gates which are respectively coupled to a row interrogate line and to the first current gate in a subsequent matrix row. If all of the elements in a particular row are in a second state, then the gate controller enables the second current gate and disables the first current gate. On the other hand, if any of the elements are in a first state, the first current gate is enabled and the second current gate is disabled. A source of interrogation pulses is connected to the input terminals of both the first and second current gates of the first matrix row. If the first current gate is enabled, then the interrogate pulse will be directed along the first matrix row interrogate line to cause the contents of the first matrix row elements to be read out into a register. On the other hand, if the first matrix row first gate is disabled, then the interrogate pulse will be directed to the gates of the second matrix row.

Each row interrogate line is coupled to a counter such that when an interrogation pulse is applied to an interrogate line, the counter is driven to a predetermined count dedicated to that line. The pulse on the interrogate line causes the contents of the elements associated therewith to be transferred to the above-mentioned register. In response to each pulse provided by a clock source, the counter is incremented and the information in the register is shifted one stage. Each time a signal representing a first state is shifted out of the register, the count in the counter is read out. The counts which are sequentially read out of the counter of course represent the addresses of those elements in a first state. Each time the counter reaches a number which is a multiple of the number of elements in each row, a signal is developed which switches all of the elements in the row most recently read to a second state thereby permitting a subsequent interrogation pulse to be applied to the next row interrogate line associated with any elements in a first state. It is pointed out that the references herein to matrix "rows" and "columns" refers only to groups of electrically related elements and should not be understood as imposing any actual physical limitations on the arrangements of the elements.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block schematic diagram of a selection device in accordance with the present invention; and FIGURE 2 is a schematic circuit diagram of a binary element suitable for use in the apparatus of FIG. 1.

Attention is now called to FIG. 1 of the drawings which illustrates a block diagram of apparatus in accordance with the invention for monitoring a plurality of conductors 10 on which signals having predetermined characteristics can randomly appear. As noted, the conductors 10 can comprise word sense lines of a content addressable memory wherein the signals comprise mismatch signals denoting that the word stored in the content addressable memory location associated with the particular word sense line mismatches the search word. Such mismatching can be in accordance with any one of several different search criteria such as "exact match," "equal to or greater than," "equal to or less than," or any one of several other criteria. U.S. patent application Ser. No. 269,009, filed Mar. 29, 1963, by Ralph J. Koerner and A. D. Scarbrough and assigned to the same assignee as the present application describes one type of content addressable memory with which the present apparatus can advantageously be utilized. Briefly, the function of the present apparatus when used in conjunction with a content addressable memory, is to sense and remember mismatch signals appearing on the conductors 10 for a full content addressable memory search period and to subsequently sequentially provide encoded signals or addresses identifying those content addressable memory locations storing words which match the search word.

In accordance with the present invention, the plurality (N) of conductors 10 is divided into P groups, each group containing $N/P$ conductors. For exemplary purposes herein, it is assumed that N equals 20 and that P equals 4.

A different binary sense element 12 is connected to each conductor 10 and is responsive to mismatch signals appearing on the conductor for switching from a first to a second state. The binary sense elements 12 are arranged in a rectangular matrix comprised of P rows and $N/P$ columns. Each matrix row contains all of the binary elements common to the same group of conductors. Thus, each of the binary elements 12 monitors a different one of the conductors and at the end of each monitoring period, it is desirable to sequentially generate coded signals identifying those conductors on which mismatch signals did not appear.

$N/P$ digit sense lines 14 are provided, each digit sense line being connected to all of the binary elements in a different one of the matrix columns. Each digit sense line 14 is connected to the input of a different stage of a shift register 16.

P row interrogate lines 18 are provided, each such row interrogate line being connected to the interrogate input terminals of all of the elements in a different one of the matrix rows. In response to an interrogation pulse applied to a row interrogate line 18, state representing signals will be provided on all of the digit interrogate lines 14 identifying the states of the elements associated with the interrogate line. The state representing signals in turn will cause the stages of the shift register 16 to assume corresponding states.

P first gates 22 are provided with each first gate being connected in series with a different row interrogate line 18. That is, the output terminal of each first gate 22 is connected to a first end of a different row interrogate line 18. The input terminal of each first gate 22 is connected to a different tap 23 on a series circuit 24 comprised of P serially connected second gates 26. Each tap is connected to the input of a different second gate 26.

P gate controllers 28 are provided, each being connected by lines 29 to the elements of a different one of the matrix rows. Each gate controller 28 is connected to control input terminals of a different pair of first and second gates 22 and 26. Each gate controller 28 is responsive to all of the elements connected thereto defining a second state for enabling the second gate 26 connected thereto and disabling the first gate 22 connected thereto. In response to any one of the elements connected thereto defining a first state, the gate controller 28 enables the first gate 22 and disables the second gate 26 connected thereto.

An interrogation pulse source 30 is connected through a delay circuit 32 to the series circuit 24 comprised of the serially connected second gates 26. In response to a signal provided by the OR gate 34, the source 30 applies an interrogation pulse to the series circuit 24 which pulse will enter the closest enabled first gate 22. Thus, assuming that all of the elements in row 1 of the matrix are in a second state, the first gate associated therewith will be disabled while the second gate associated therewith will be enabled. Thus, the pulse can pass to the junction of the input terminals of the first and second gates associated with row 2 of the matrix. Assuming that at least one of the elements in row 2 is in a first state, the interrogation pulse will be applied to the row 2 interrogate line to cause all of the row 2 elements to provide state representing signals on the digit sense lines 14. As a consequence, the stages of the shift register 16 will be driven to states corresponding to the states of the elements in row 2.

Each of the row interrogate lines 18 is connected to a different input terminal of a counter 40. In response to the application of the interrogation pulse to any one of the row interrogate lines, the counter 40 will be driven to a predetermined count dedicated to the particular row interrogate line. As an example, an interrogation pulse applied to the row 1 interrogate line will drive the counter to a zero count, an interrogation pulse applied to the row 2 interrogate line will drive the counter to a count equal to $2N/P$, an interrogation pulse applied to the row 3 interrogate line will drive the counter to a count equal to $3N/P$, and so forth. A source of clock signals 42 is connected to both the counter 40 and the shift register 16. The counter 40 is incremented in response to each pulse provided by the source 42 while the contents of the shift register 16 are shifted one stage to the right in response to each pulse. The outputs of the counter 40 and the rightmost stage of the shift register 16 are connected to the input of an AND gate 44. The AND gate 44 is enabled in response to each output signal provided by shift register 16 representing a first state. Thus, assume that the element in column 3 of row 2 is in a first state while all of the other elements in both rows 1 and 2 are in a second state. As noted previously, the application of an initial interrogation pulse to the series circuit 26 will bypass the row 1 interrogate line and will cause the contents of the row 2 elements to be transferred into the shift register 16. Concurrently, the counter 40 will be driven to a count of *N/P*. In response to each of the subsequent two clock pulses provided by the source 42, the count defined by the counter 40 will be incremented by one. The output signals provided by the shift register 16 in response to these clock pulses will define second states. The subsequent clock pulse will increment the counter and in addition will cause the shift register 16 to provide an output signal representing a first state. Thus, the AND gate 44 will be enabled to thereby cause the count to be entered into storage means 46 as an address identifying a conductor 10 on which no mismatch signals appeared.

The output of counter 40 is also connected to the input of a decoder circuit 48 which is responsive to counts equal to multiples of *N/P* for providing an output signal. The output signal of decoder circuit 48 is applied to the input of OR gate 34 and in addition directly to the series circuit 24. The signal applied directly to the series circuit 24 will of course traverse the row interrogate line 18 associated with the row whose contents were most recently read into the shift register 16. This signal can be of sufficient magnitude to destructively read all of the elements in that row to thereby switch those elements to a second state. Thus, when the interrogation pulse is applied to the series circuit 24 after a certain time delay introduced by delay circuit 32, it will enter the interrogate line of a subsequent row which includes at least one element in a first state.

A command register 50 is provided for initially storing a command to initiate the operation just described. That is, a command calling for a sequential readout operation of the sense element matrix can be entered into the register 50. The output of the command register is coupled to the input of the OR gate 34 which in turn will cause the initial interrogation pulse to be applied to the series circuit 24. The operation can be terminated in response to an interrogation pulse being sensed at the output of the second gate 26 associated with matrix row P.

A binary sense element suitable for use in the matrix of FIG. 1 is illustrated in FIG. 2. The sense element of FIG. 2 comprises a bistable tunnel diode circuit of the type described in U.S. patent application Ser. No. 133,857 filed Aug. 25, 1961 now Patent No. 3,198,958, by Samuel Nissim and assigned to the same assignee as the present application. Briefly, the circuit of FIG. 2 includes a tunnel diode 60 biased for bistable operation. A positive supply voltage is applied through a resistor 62 to a first terminal of the tunnel diode. A second terminal of the tunnel diode is connected through a parallel resistance capacitance circuit 64 to ground. The first tunnel diode terminal is connected through a conventional diode 66 and a second parallel resistance capacitance circuit 68 to ground. The conductor 10 is connected to the tunnel diode circuit through a resistor 70 which is connected to the first tunnel diode terminal. The row interrogate line 18 is connected to the second tunnel diode terminal. The digit sense line 14 is connected to the junction between the diode 16 and the parallel circuit 68. The gate controller input line 29 is connected through a resistor 72 to the first tunnel diode input terminal.

As noted, the tunnel diode is biased for bistable operation such that it can assume either a high current low voltage stable state or a low current high voltage stable state. Let it be assumed that the mismatch signals being sensed on the conductors 10 are of positive polarity. Consequently, it is desired to initially set the tunnel diode to a high current low voltage state, i.e. a first state. In response to the appearance of a positive pulse on the conductor 10, the current through the tunnel diode will exceed a peak value and consequently the tunnel diode will be switched to its low current high voltage state.

As indicated in the cited patent application pertaining to the tunnel diode circuit, the diode 66 is back biased for either state of the tunnel diode 60. However, the degree of back biasing is greater for one state than the other and consequently the tunnel diode state can be non-destructively read by applying a small negative pulse to the row interrogate line 18. This small negative interrogation pulse will draw current through diode 66 for only one state of the tunnel diode 60. The effect of the current drawn through diode 66 is apparent on sense line 14 and thus, the state of the element 12 can be read into a corresponding stage of the shift register 16. On the other hand, a sufficiently large negative pulse applied to the row interrogate line 18 will destructively read the state of the element 12. Thus, if the tunnel diode 60 is in a high current low voltage state, a large negative pulse applied to row interrogate line 18 will increase the current in the tunnel diode 60 past its characteristic S curve peak to thereby switch the tunnel diode to the low current high voltage state, i.e. the second state. The voltage at the first terminal of the tunnel diode 60 will of course differ for the two possible stable states. Thus, the state of the tunnel diode 60 is indicated by the current drain through a high impedance resistor 72 connected to the gate controller input line 29. The gate controller 28 can be, e.g. a summing amplifier capable of detecting whether any of the elements 12 connected thereto is in a high current low voltage state and thus contributing less current to the gate controller 28.

The first and second gates 22 and 26 in FIG. 1 can comprise simple transistor switching circuits which are responsive to the output of the gate controller 28. By utilizing opposite type transistors in the first and second gates, the signal provided by the gate controller 28 can be utilized to both on-bias one of the gates and off-bias the other.

It should be apparent that in the embodiment of the invention disclosed in FIG. 1, the contents of each matrix row is read out twice, once non-destructively and once destructively. This multiple type of read out is desirable in some applications of the invention. In other applications where a multiple read out is not necessary, then the path including the delay circuit 32 which is connected in parallel with the direct connection between the decoder 48 and the series circuit 24 is not required. Also, where only a destructive read out mode is employed, destructive readout binary elements such as single aperture magnetic cores can be used in the matrix if the signal levels provided on the conductors 10 are sufficiently high. A tunnel diode circuit of the type illustrated is normally able to respond to much lower signal levels than other types of elements, such as cores.

From the foregoing, it should be apparent that an apparatus has been disclosed herein suitable for monitoring a plurality of conductors for a certain time period and for subsequently sequentially generating coded signals identifying those conductors on which a signal having a predetermined characteristic did not appear. As noted, the conductors can comprise content addressable memory word sense lines and the signals can comprise mismatch signals. In situations where the only search criteria being employed is "exact match," the elements 12 can be connected directly to the word sense lines. Where magnitude comparison criteria are utilized, e.g. "equal to or greater than," then a second binary element can be connected to each conductor prior to the matrix elements. Coupling between the second binary elements and the matrix elements can then be selectively inhibited in accordance with the teachings of the cited U.S. patent application Ser. No. 269,009.

It should be appreciated that the apparatus herein is most useful in applications where it is contemplated that very few addresses will have to be generated compared to the number of conductors being monitored. That is, with the relatively simple hardware introduced herein, addresses identifying conductors on which no mismatch signals appear can be generated in considerably less time than is required by conventional commutator circuitry in which each sensing element would have to be sequentially examined. In the worst case situation, the apparatus herein would provide all of the matching addresses in the same amount of time as would be required by a conventional commutator.

The embodiments of the invention in which an exclusive property or privilege is claimed are defined as follows:

1. In combination with a plurality of binary elements each capable of assuming either a first or second state, means for sequentially generating coded signals identifying those elements in a first state, said means comprising:
- means interconnecting said elements in a matrix comprised of rows and columns;
- a register;
- means for sequentially reading out the contents of each of said rows into said register;
- a counter;
- means for driving said counter to a different predetermined count in response to the contents of each row being read out;
- means for concurrently shifting the contents of said register and incrementing said counter; and
- means responsive to a predetermined binary signal being shifted out of said register for reading out the contents of said counter.

2. In combination with a plurality of binary elements each capable of assuming either a first or second state, means for sequentially generating coded signals identifying those elements in a first state, said means comprising:
- means interconnecting said elements in a matrix comprised of rows and columns;
- a register;
- means for indicating those rows including elements in a first state;
- means for sequentially reading out the contents of those rows including elements in a first state into said register;
- a counter;
- means for driving said counter to a different predetermined count in response to the contents of each row being read out;
- means for concurrently shifting the contents of said register and incrementing said counter; and
- means responsive to a predetermined binary signal being shifted out of said register for reading out the contents of said counter.

3. In combination with a plurality of binary elements each capable of assuming either a first or second state, means for sequentially generating coded signals identifying those elements in a first state, said means comprising:
- means interconnecting said elements in a matrix comprised of P rows and $N/P$ columns;
- P interrogate lines each coupled to all of the elements in a different one of said rows;
- $N/P$ sense lines each coupled to all of the elements in a different one of said columns;
- a register including $N/P$ stages;
- means coupling each of said sense lines to a different one of said register stages;

- P first gates each having an input terminal and an output terminal, each of said first gate output terminals connected to a different one of said interrogate lines;
- a plurality of second gates each having an input terminal and an output terminal;
- means connecting said second gates in series;
- means connecting each of said first gate input terminals to the input terminal of a different one of said second gates;
- P gate controllers each connected to all of the elements of a different one of said rows and responsive to any one of said elements defining a first state for enabling the first gate and disabling the second gate associated therewith and responsive to all of said elements defining a second state for disabling the first gate and enabling the second gate associated therewith;
- source means for supplying an interrogation pulse to said serially connected second gates whereby said interrogation pulse will be steered out of said series circuit into the enabled first gate closest to said source means;
- each of said elements responsive to a pulse on the interrogate line associated therewith for inducing a state representing signal on the sense line associated therewith;
- each of said $N/P$ register stages responsive to first and second state representing signals on the sense lines associated therewith for respectively assuming first and second states;
- a counter;
- means coupling each of said interrogate lines to said counter for driving said counter to a predetermined count in response to said interrogation pulse being applied thereto;
- a source of clock pulses;
- means responsive to each of said clock pulses for concurrently shifting the contents in said register and for incrementing said counter; and
- means responsive to first state representing signals shifted out of said register for reading out the count in said counter.

4. The apparatus of claim 3 including means for generating a reset signal in response to said counter defining a count which is a multiple of $N/P$; and
- means responsive to the generation of said reset signal for switching all of the elements in the most recently read matrix row to a second state.

5. The apparatus of claim 4 including delay means responsive to the generation of said reset signal for applying an interrogation pulse to said series circuit.

6. The apparatus of claim 3 wherein each of said binary memory elements comprises a circuit including a tunnel diode biased for bistable operation.

7. In combination with a plurality of conductors on which indicating signals having a predetermined characteristic can randomly appear, means responsive to said indicating signals for recording their appearance and for subsequently sequentially generating coded signals identifying those conductors on which said indicating signals did not appear, said means comprising:
- a plurality of binary elements arranged in a matrix comprised of rows and columns;
- each of said elements connected to a different one of said conductors and responsive to said indicating signal appearing thereon for assuming a second state;
- a register;
- means for sequentially reading out the contents of each of said rows including elements in a first state into said register;
- a counter;
- means for driving the counter to a different predetermined count in response to the contents of each row being read out;

means for concurrently shifting the contents of said register and incrementing said counter; and means responsive to a predetermined binary signal being shifted out of said register for reading out the contents of said counter.

8. In combination with a content addressable memory including a plurality of memory locations, each memory location having a different word sense line associated therewith on which mismatch signals can randomly appear, means responsive to said mismatch signals for recording their appearance and for subsequently sequentially generating coded signals identifying those word sense lines on which said mismatch signals did not appear, said means comprising:

a plurality of binary sense elements each connected to a different one of said word sense lines;

means interconnecting said sense elements in a matrix comprised of rows and columns;

a register;

means for sequentially reading out the contents of each of said rows into said register;

a counter;

means for driving said counter to a different predetermined count in response to the contents of each row being read out;

means for concurrently shifting the contents of said register and incrementing said counter; and means responsive to a predetermined binary signal being shifted out of said register for reading out the contents of said counter.

9. In combination with a content addressable memory including N memory locations, each memory location having a different word sense line associated therewith on which mismatch signals can randomly appear, means responsive to said mismatch signals for recording their appearance and for subsequently sequentially generating coded signals identifying those word sense lines on which said mismatch signals did not appear, said means comprising:

a plurality of binary elements arranged in a matrix comprised of P rows and $N/P$ columns;

each of said elements connected to a different one of said word sense lines and responsive to said mismatch signal appearing thereon for assuming a second state;

a register including $N/P$ stages;

gate controller means for indicating those rows including elements in a first state;

means responsive to said gate controller means for sequentially reading out the contents of the indicated rows into said register;

a counter;

means for driving said counter to a different predetermined count in response to the contents of each row being read out;

means for concurrently shifting the contents of said register and incrementing said counter; and means responsive to a predetermined binary signal being shifted out of said register for reading out the contents of said counter.

10. In combination with a content addressable memory including N memory locations, each memory location having a different word sense line associated therewith on which mismatch signals can randomly appear, means responsive to said mismatch signals for recording their appearance and for subsequently sequentially generating coded signals identifying those word sense lines on which said mismatch signals did not appear, said means comprising:

N binary sense elements each connected to a different one of said word sense lines;

means interconnecting said elements in a matrix comprised of P rows and $N/P$ columns;

P interrogate lines each coupled to all of the elements in a different one of said rows;

$N/P$ sense lines each coupled to all of the elements in a diffeernt one of said columns;

a register including $N/P$ stages;

means coupling each of said sense lines to a different one of said register stages;

a source of interrogation pulses;

switching means responsive to the states of said elements for sequentially connecting said source of interrogation pulses to each of said row interrogate lines associated with at least one element in a first state;

each of said elements responsive to a pulse on the interrogate line associated therewith for inducing a state representing signal on the sense line associated therewith;

each of said $N/P$ register stages responsive to first and second state representing signals on the sense lines associated therewith for respectively assuming first and second states;

a counter;

means coupling each of said interrogate lines to said counter for driving said counter to a predetermined count in response to said interrogation pulse being applied thereto;

a source of clock pulses;

means responsive to each of said clock pulses for concurrently shifting the contents in said register and for incrementing said counter; and means responsive to first state representing signals shifted out of said register for reading out the count in said counter.

11. The combination of claim 10 wherein said switching means includes P first gates each having an input terminal and an output terminal, each of said first gate output terminals connected to a different one of said interrogate lines;

a plurality of second gates each having an input terminal and an output terminal;

means connecting said second gates in series;

means connecting each of said first gate input terminals to the input terminal of a different one of said second gates;

P gate controllers each connected to all of the elements of a different one of said rows and responsive to any one of said elements defining a first state for enabling the first gate and disabling the second gate associated therewith and responsive to all of said elements defining a second state for disabling the first gate and enabling the second gate associated therewith; and means connecting said source of interrogation pulses to said serially connected second gates.

12. In combination with a plurality of binary elements each capable of defining either a first or second state, means for sequentially generating coded signals identifying those elements in a first state, said means including:

a plurality of interrogate lines each coupled to a different group of said binary elements;

an interrogation signal source; and gating means for sequentially coupling said interrogation signal source only to those interrogate lines coupled to at least one binary element defining a first state.

13. The combination of claim 12 including a plurality of first gates, each having an input terminal and an output terminal;

means connecting said plurality of first gates in series;

a plurality of taps each connected to the input terminal of a different one of said first gates; and a plurality of second gates each coupling a different one of said taps to a different one of said interrogate lines.

14. The combination of claim 13 including a plurality of gate controlling means each coupled to a different group of said elements for controlling in response to the states defined thereby the first and second gates coupled to the interrogate line coupled to that group of elements.

15. The combination of claim 14 including:

a register; and means responsive to the application of said interrogation signal to one of said interrogate lines for reading out the states defined by the elements coupled to that interrogate line into said register.

16. The combination of claim 15 including:

a counter;

means for driving said counter to a different predetermined count in response to the states defined by the elements being read out;

means for concurrently shifting the contents of said register and incrementing said counter; and means responsive to a predetermined binary signal being shifted out of said register for reading out the contents of said counter.

No references cited.

ROBERT C. BAILEY, *Primary Examiner.*

R. B. ZACHE, *Assistant Examiner.*